(12) United States Patent
Jerance et al.

(10) Patent No.: US 8,072,209 B2
(45) Date of Patent: Dec. 6, 2011

(54) POSITION SENSOR WITH VARIABLE DIRECTION OF MAGNETIZATION AND METHOD OF PRODUCTION

(75) Inventors: Nikola Jerance, Besancon (FR); Richard Arlot, Bonnevent Velloreille (FR)

(73) Assignee: Sonceboz SA, Sonceboz (CH)

( * ) Notice: Subject to any disclaimer, the term of this patent is extended or adjusted under 35 U.S.C. 154(b) by 293 days.

(21) Appl. No.: 12/281,207

(22) PCT Filed: Mar. 2, 2007
(Under 37 CFR 1.47)

(86) PCT No.: PCT/FR2007/000382
§ 371 (c)(1),
(2), (4) Date: Mar. 6, 2009

(87) PCT Pub. No.: WO2007/099238
PCT Pub. Date: Sep. 7, 2007

(65) Prior Publication Data
US 2010/0231205 A1   Sep. 16, 2010

(30) Foreign Application Priority Data
Mar. 2, 2006 (FR) ...................................... 06 01877

(51) Int. Cl.
*G01B 7/14* (2006.01)
(52) U.S. Cl. ................................................. 324/207.23
(58) Field of Classification Search ... 324/207.2–207.26
See application file for complete search history.

(56) References Cited

U.S. PATENT DOCUMENTS

| | | | |
|---|---|---|---|
| 6,154,025 A * | 11/2000 | Schelter et al. | 324/207.21 |
| 6,163,147 A * | 12/2000 | Peilloud | 324/207.22 |
| 6,304,078 B1 * | 10/2001 | Jarrard et al. | 324/207.2 |
| 6,522,130 B1 | 2/2003 | Lutz | |
| 6,545,463 B1 | 4/2003 | Dettmann et al. | |
| 6,720,763 B1 * | 4/2004 | Nehl et al. | 324/207.25 |
| 7,202,660 B2 * | 4/2007 | Kuroyanagi et al. | 324/207.25 |
| 7,375,516 B2 * | 5/2008 | Takenaga et al. | 324/252 |
| 2003/0128026 A1 | 7/2003 | Lutz | |
| 2005/0030012 A1 * | 2/2005 | Kunz-Vizenetz | 324/207.25 |
| 2007/0090827 A1 * | 4/2007 | Jarrard | 324/207.2 |

FOREIGN PATENT DOCUMENTS

| | | |
|---|---|---|
| DE | 202 10 548 | 8/2003 |
| EP | 1 074 818 | 2/2001 |
| EP | 0 979 988 | 6/2003 |
| WO | 00 04339 | 1/2000 |

OTHER PUBLICATIONS

U.S. Appl. No. 12/093,705, filed May 14, 2008, Jerance, et al.

* cited by examiner

*Primary Examiner* — Roberto Velez
*Assistant Examiner* — Joshua Benitez
(74) *Attorney, Agent, or Firm* — Oblon, Spivak, McClelland, Maier & Neustadt, L.L.P.

(57) ABSTRACT

A magnetic sensor of rotary, linear, or curvilinear displacement using at least one permanent magnet and at least one magnetosensitive element, which can move with respect to one another. The magnet exhibits a direction of magnetization that varies continuously along the direction of displacement, with the exclusion of a diametral magnetization in the case of a rotary sensor.

23 Claims, 14 Drawing Sheets

POSITION SENSOR WITH VARIABLE DIRECTION OF MAGNETIZATION AND METHOD OF PRODUCTION

The present invention relates to the field of magnetic position sensors having at least one permanent magnet.

The present invention proposes more particularly to use a permanent magnet having a magnetization direction that varies in the movement direction.

Sensors that detect position on the basis of a magnetic field offer numerous advantages:

- no mechanical contact with the moving portion, and therefore no wear;
- insensitivity to dirt;
- low production cost; and
- long lifespan.

It is also advantageous, if possible, to remove drawbacks suffered by certain magnetic sensors, such as dependence on hysteresis due to the ferromagnetic pieces and to the remnant induction of the permanent magnet (this induction depends on temperature variations and must, in certain cases, be compensated, and, in addition, decreases irreversibly over time because of the ageing of the magnet).

In the state of the art, Patent Document FR 2 691 534 discloses a linear position sensor, but the overall size and the length of the magnet used limit practical use of that sensor for long travel strokes. That sensor also has hysteresis due to the ferromagnetic stators, and the measurement depends on the variation in the remnant induction that must be compensated.

Patent Document U.S. Pat. No. 6,211,668 also discloses a linear position sensor, but the magnetic field variation in that sensor is directly related to those dimensions, which limits practical implementation of it for long travel strokes. That sensor also measures the intensity of the magnetic field, which makes it dependent on the variation in the remnant induction of the permanent magnet relative to temperature and to time.

Patent Documents U.S. Pat. No. 6,731,108, U.S. Pat. No. 6,960,974, and WO2004/015375 are also known in the state of the art. They make it possible to measure the linear movement of a magnet relative to one or more magnetosensitive elements. However, for practically implementing travel strokes longer than in the range 20 mm to 25 mm, those sensors require a plurality of probes placed along the various portions of the travel stroke, thereby increasing the cost of the sensor and requiring precise positioning of the probes.

The present invention proposes to remedy all or some of the above-mentioned problems by providing a movement magnetic sensor for sensing rotary, linear, or curvilinear movement using at least one permanent magnet and at least one magnetosensitive element that are mounted to move relative to each other, said movement magnetic sensor being characterized in that the magnet presents a magnetization direction that varies substantially linearly in the movement direction in which the magnet moves over a surface defined by said movement direction and by a normal direction, to the exclusion of diametrical magnetization when the sensor is a rotary sensor.

Preferably, the magnet is constituted by a magnet generating a magnetic field whose normal component (Y), and at least one of the components constituted by its tangential component (X) and by its transverse component (Z), as measured at the surface of the magnet, vary periodically with N periods over the movement stroke, where N is an integer.

In a preferred embodiment, the invention provides a sensor having a long linear travel stroke. For this purpose, a moving magnet is used that is of length corresponding substantially to the working stroke whose magnetization varies substantially linearly in the movement direction. In the vicinity of the magnet, this magnetization generates a magnetic field whose tangential component (X), normal component (Y), and transverse component (Z) relative to the magnet are substantially sinusoidal, over a large portion of stroke. The components Y and Z have the same phase, while the component X is phase-shifted by one quarter of one period.

If the components X and Y are measured in a point of space that surrounds the magnet, it is possible to determine the linear position of the magnet, by applying the following formula:

$$x = \arctan\left(\frac{B_{x\,max}}{B_{y\,max}} \frac{B_y}{B_x}\right)$$

where:
x is the linear position;
$B_x$ is the tangential component of the magnetic field;
$B_{x\,max}$ is the amplitude of $B_x$;
$B_y$ is the normal component of the magnetic field;
$B_{y\,max}$ is the amplitude of $B_y$.

In a more general case, it is possible to use the following formula:

$$x(t) = \arctan\left(\frac{B_{x\,max}}{B_{yz\,max}} \frac{B_{yz}}{B_x}\right)$$

where:
x is the linear position;
$B_x$ is the tangential component of the magnetic field;
$B_{x\,max}$ is the amplitude of $B_x$;
$B_{yz\,max}$ is the amplitude of $B_{yz}$ with $B_{yz} = k_y \cdot B_y + k_z \cdot B_z$
where:
$B_y$ is the normal component of the magnetic field; and
$B_z$ is the transverse component of the magnetic field.

In a general case, the decoding of the linear position of the magnet, on the basis of these two components, whose amplitudes are in general different, requires the two components used to be normalized so as to be able to do the computation of the arctangent so as to deduce the linear position therefrom. These arctangent and normalization functions are performed either by a separate element or directly by a probe (e.g. MELEXIS 90316) integrating the measurement of the two components of the field, the computation of arctangent, and the normalization of the two components of the field. It is possible to do particular developments where $B_{x\,max}$ and $B_{yz\,max}$ have substantially the same values, by appropriately choosing the position and the direction of the probe.

In the sensor presented, it is possible to obtain the angle of the magnetic field proportional to the movement. It suffices to incline the measurement plane relative to the magnetization plane. In this manner:

$$B_{y1} = B_y \cos(\theta) - B_z \sin(\theta)$$

$$B_{x1} = B_x$$

where:
$B_{x1}$ and $B_{y1}$ are components of the magnetic induction in the measurement plane;
$B_x$ is the tangential component of the magnetic induction;
$B_y$ is the normal component of the magnetic induction;
$B_z$ is the axial component of the magnetic induction; and
$\theta$ is the angle of inclination of the probe.

It is now possible to apply the same formula but with the components of the field in the measurement plane:

$$X = \arctan\left(g \cdot \frac{B_{y1}}{B_{x1}}\right)$$

where:
X is the linear or rotary movement measured;
$B_{x1}$ and $B_{y1}$ are components of the magnetic induction in the measurement plane; and
g is the gain that makes it possible to compensate for the difference in the amplitudes.

This configuration makes it possible to adjust the gain to be applied before the arctangent computation.

If the amplitudes of the two components of the magnetic field in the measurement plane $B_{x1}$, $B_{y1}$ are equal, these signals represents two sinewaves in phase quadrature, and therefore the angle of the measured field follows the movement.

It is thus possible, by adjusting the angle of inclination θ, to measure the movement directly by computing arctan $$\left(\frac{B_{y1}}{B_{x1}}\right)$$

without applying any gain in order to compensate for the difference in the amplitudes.

In the state or the art, magnetoresistive probes are known that make it possible to measure the angle of the magnetic field. Such a probe has two Wheatstone bridges, whose outputs, for a sufficient amplitude of the magnetic field, depend solely on the angle of the magnetic field, in accordance with the formula:

$$V_A = S \cdot \cos(2\alpha)$$

$$V_B = S \cdot \sin(2\alpha)$$

where:
α is the angle of the magnetic field;
$V_A$ is the output voltage of the first Wheatstone bridge; and
$V_B$ is the output voltage of the second Wheatstone bridge.

It is possible to obtain directly the direction of the magnetic field, and thus the movement, by using the following formula:

$$\alpha = \frac{1}{2}\arctan\left(\frac{V_B}{V_A}\right)$$

This sensor can be implemented practically with the probe that moves along the axis X, past a stationary magnet, or with the magnet being moving and the probe being stationary, the former solution taking up less space, for example, and the latter solution making assembly easier.

The advantage of this invention is firstly the travel stroke obtained: said stroke depends solely on the dimensions of the magnet. The result of the measurement does not depend on the remnent induction of the magnet, or on its variation as a function of temperature, thereby avoiding the need to compensate for temperature variations. The economic advantage is the simple structure of the sensor (a probe facing a magnet mounted, if necessary, on a ferromagnetic yoke, and optionally embedded therein). Since the processing of the measured signals corresponds to an angle computation, it is possible to use probes that are normally used for angular position sensors (e.g. MLX90316), with all of the non-linearity corrections that might be used in such sensors. If the components X and Y are used for measuring the movement, the sensor is insensitive to (moderate) offsets along the axes Y and Z, which is very advantageous in terms of production and of use (robustness of the sensor) and makes it possible to reduce the costs significantly.

The above-described magnetization would be difficult to achieve with the usual means in magnetic sensor production. In particular, it is difficult to generate a magnetizing field that turns as a function of position. In order to remedy that, a method is described below with a flexible magnet that makes it possible to implement this type of magnetization, in a manner that is simple and easy to achieve.

The permanent magnet is magnetized over the periphery of a support of cylindrical shape, this support not presenting magnetic properties (which also makes the magnet easier to handle). The permanent magnet used is, in general, a magnet of a rare earth or of ferrite mixed with a flexible plastic binder (or a deformable assembly of non-flexible magnets). In the simplest case, it is an isotropic magnet—this makes it possible to direct the field lines with the geometrical shape of the support. The field applied during the magnetization is uniform or almost uniform, which is easy to obtain in an appropriately dimensioned coil.

The magnet is then unfolded lengthwise and laid flat. The magnetization obtained varies linearly with position, and the components of the magnetic field around the magnet make it possible to apply the above-described measurement technique.

In order to reduce edge effects, and in a preferred embodiment, it is possible to place the magnet in a coil so as to have the magnetization along the axis X on the edges, once the magnet is unfolded. In order to increase the amplitude of the magnetic field measured, it is then possible to mount the magnet on a ferromagnetic yoke.

The magnetization obtained in the magnet from a coil can present an angular error relative to a desired ideal magnetization (e.g. perfectly diametrical) because of the curvature of the field lines at the surface of the magnet.

In order to correct this defect, it is possible to use a magnetization profile that is slightly corrected (e.g. elliptical) or to apply a non-linear transfer function to the output of the sensor, which is an option already incorporated into certain measurement circuits (e.g. MLX90316).

Some of the problems explained for linear position sensors exist in rotary magnetic sensors. For example, it is always advantageous to eliminate the influence of the remnant induction of the magnet. In certain cases, the magnetosensitive element is placed off the axis of rotation (e.g. if a through shaft exists in the application). In which case, the advantage of the sensor proposed by this invention is constituted by using a magnet of length substantially equal to the length of the working travel stroke. Rotary sensors having long strokes (close to) 360° are often impractical for short strokes (their precision is not sufficient). The advantage procured by the present invention lies in the fact that the magnetization direction presents a variation close to 360° over the working stroke, for an adapted magnetization method.

In order to make an angular or curvilinear position sensor from the above-presented linear sensor, it suffices to use the flexibility of the magnet used to curve the stroke of the presented sensor. In which case, it is, for example, possible to mount the magnet on a yoke whose diameter is larger than the diameter of the magnetization support. In this way, an angular position sensor is obtained with a stroke shorter than 360° using the same position computation technique, with a measured field rotation close to 360° which improves the resolution of the sensor.

A practical problem arises in certain assembly methods in which the measured stroke position is not known in advance. This problem is solved in simple manner by using the present invention. It suffices to wind a magnet a plurality of times around the magnetization support. Once unfolded, it has a plurality of magnetization angle periods. This makes it possible to obtain an angular stroke repeated a plurality of times along the length of the magnet. It is easily possible to insert one or more particularities (magnetization periods that are more or less long). This can, for example, be useful for incremental sensors. In all of these cases, it is, naturally, possible to obtain the same result by using a plurality of magnets.

A particular assembly configuration would make it possible to achieve position measurement by using a plurality of tracks with different magnetizations for the same position.

In another embodiment, it is possible to use two probes, measuring the same components of the magnetic field for the same position, by using the symmetry of the magnet. This can be useful for eliminating or reducing the influence of an external magnetic field.

Another manner of achieving the desired magnetization using the principle described by the present invention is to use a deformable assembly of non-flexible magnets, e.g. magnets adhesively bonded to a deformable support, which would make it possible to obtain a variation in magnetization angle by folding the support.

The invention can be better understood on reading the following description given with reference to the accompanying drawings, in which:

FIG. 1 shows a magnet (1) having magnetization, represented by the vector $\vec{M}$, whose direction varies linearly along the length of the magnet in a plane defined by the movement direction X and by a normal to that direction. As can be observed, the field lines inside the magnetic field inside the magnet are non-collinear, which constitutes one of the basic principles of the invention.

FIG. 2 shows the minimum structure of the sensor: the magnet (1) that moves relative to a probe (11) in the movement direction (5) defined by the axis X, the axis Y being defined as being the normal to the surface of the magnet.

FIG. 3 shows the tangential, normal, and transverse components generated at a point in the vicinity of the magnet (1). The components Y and Z have the same phase, whereas the component X is phase-shifted by one quarter of one period.

FIG. 4 shows the magnet (1) mounted on a ferromagnetic yoke (2) that moves relative to a probe (11).

FIG. 5 shows the method of magnetizing the magnet (1) which is wound around a support (3) of cylindrical shape, which support does not have any magnetic properties. The resulting assembly is placed in a coil (4) that generates a substantially uniform magnetic field.

FIG. 6 shows the magnet (1), unwound along the axis X (lengthwise) and laid flat so as to obtain a variation in the magnetic field lines along the measured movement.

Figure 7:
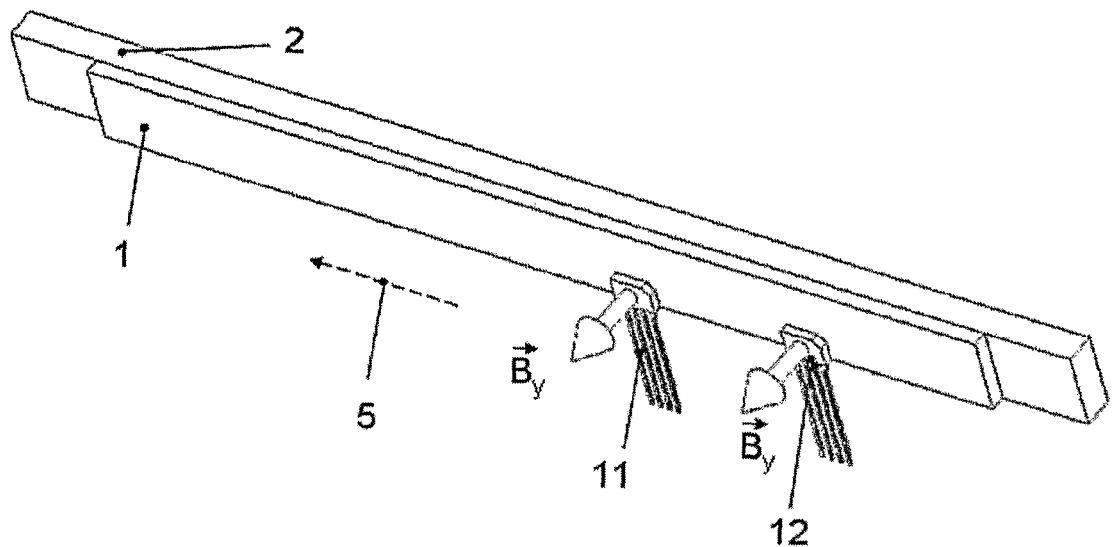
FIG. 7 shows a sensor that measures the normal component at two points.
Figure 8:
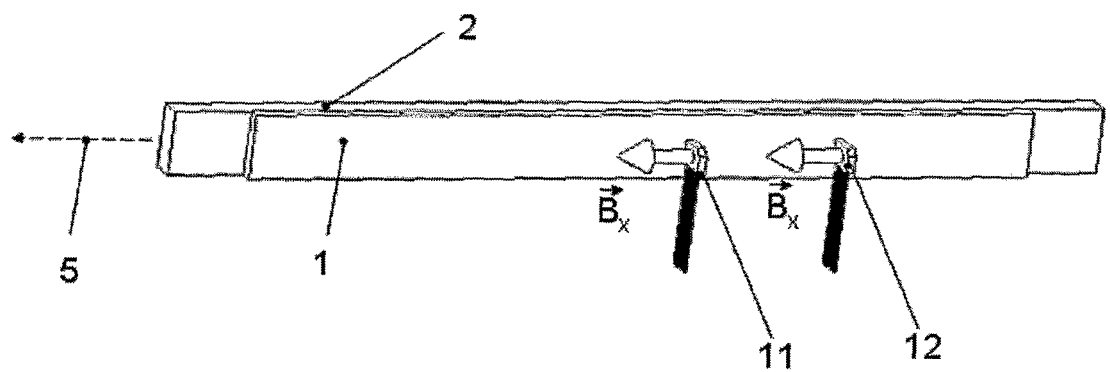
FIG. 8 shows a sensor that measures the tangential component at two points.
Figure 9:
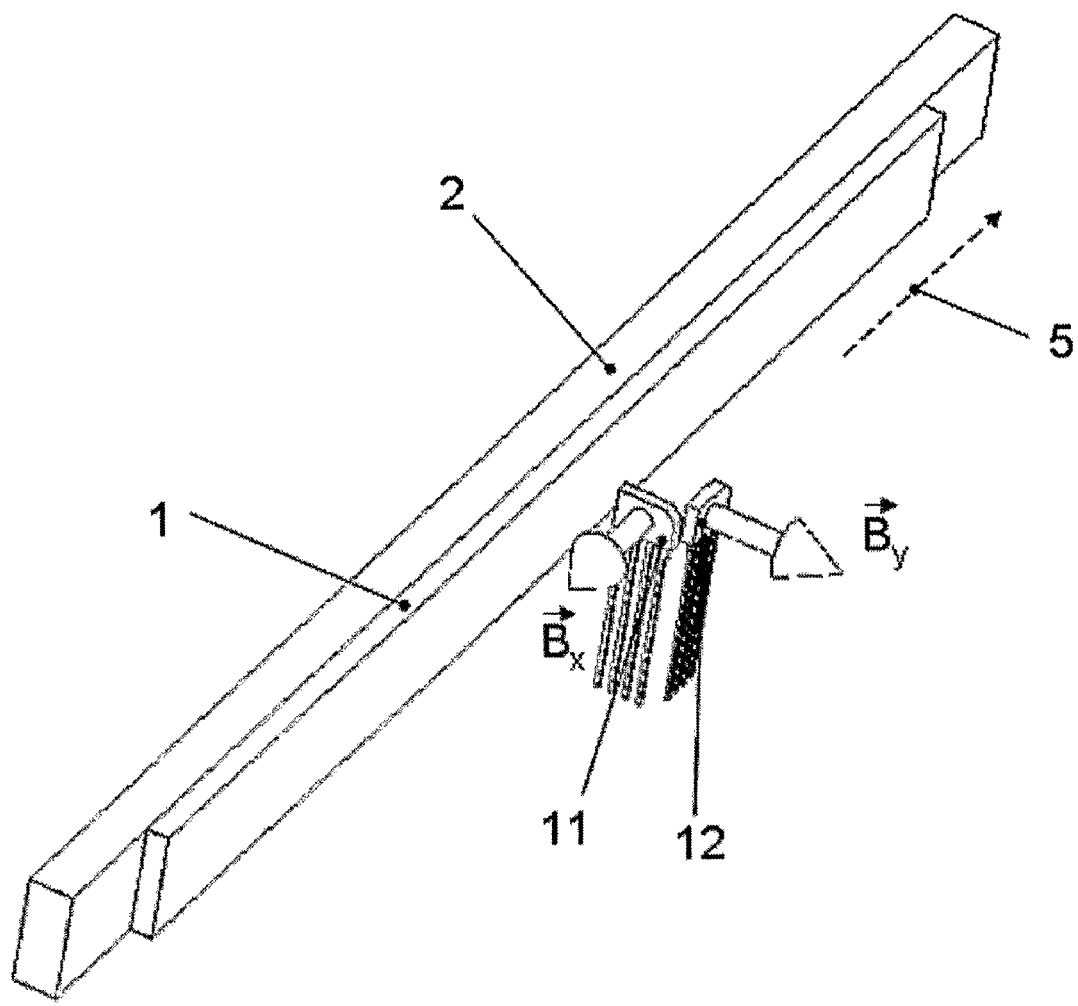
FIG. 9 shows a sensor that measures the tangential component and the normal component at a single point with two probes.

FIGS. 7, 8, and 9 shows variants of this sensor, with the magnet (1), optionally mounted on a ferromagnetic yoke (2), with the same type of magnetization, but with at least two magnetosensitive elements (11 and 12), making it possible to procure detection that is phase-shifted (by one quarter of one period, preferably) of the same magnetic field component—normal (FIG. 7) and/or transverse or tangential (FIG. 8). FIG. 9 shows an embodiment measuring the magnetic field along the axis X and Y, by using two probes.

Figure 10:
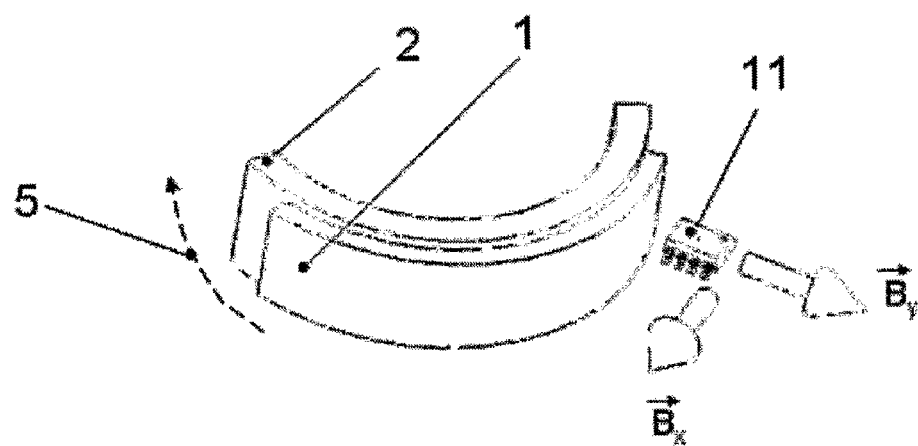
FIG. 10 shows an embodiment of a curvilinear sensor.

FIG. 10 shows an example of a magnet (1) mounted on a curvilinear support (2) with a probe (11) that measures the component X (tangential component) and the component Y (normal component) on a travel stroke along the support.

Figure 1:
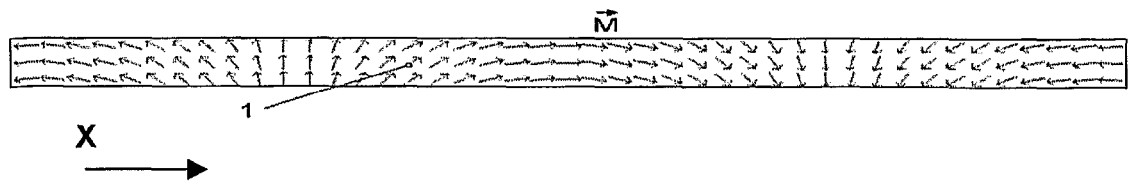
FIG. 1 shows the magnetization described by the present invention.
Figure 2:
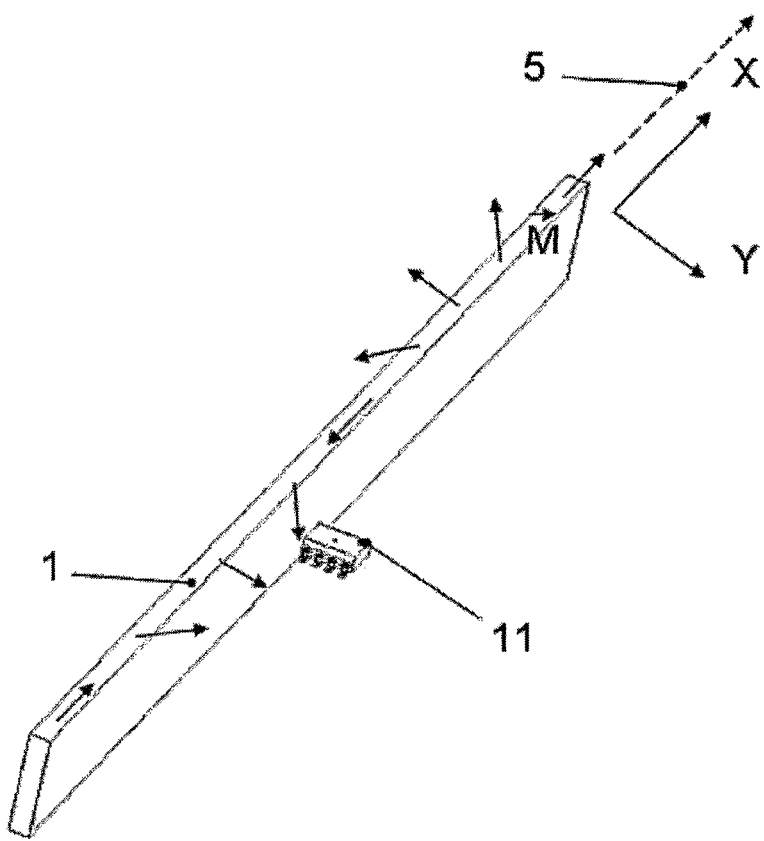
FIG. 2 shows an embodiment in which the sensor is made up of a magnet and of a probe.
Figure 3:
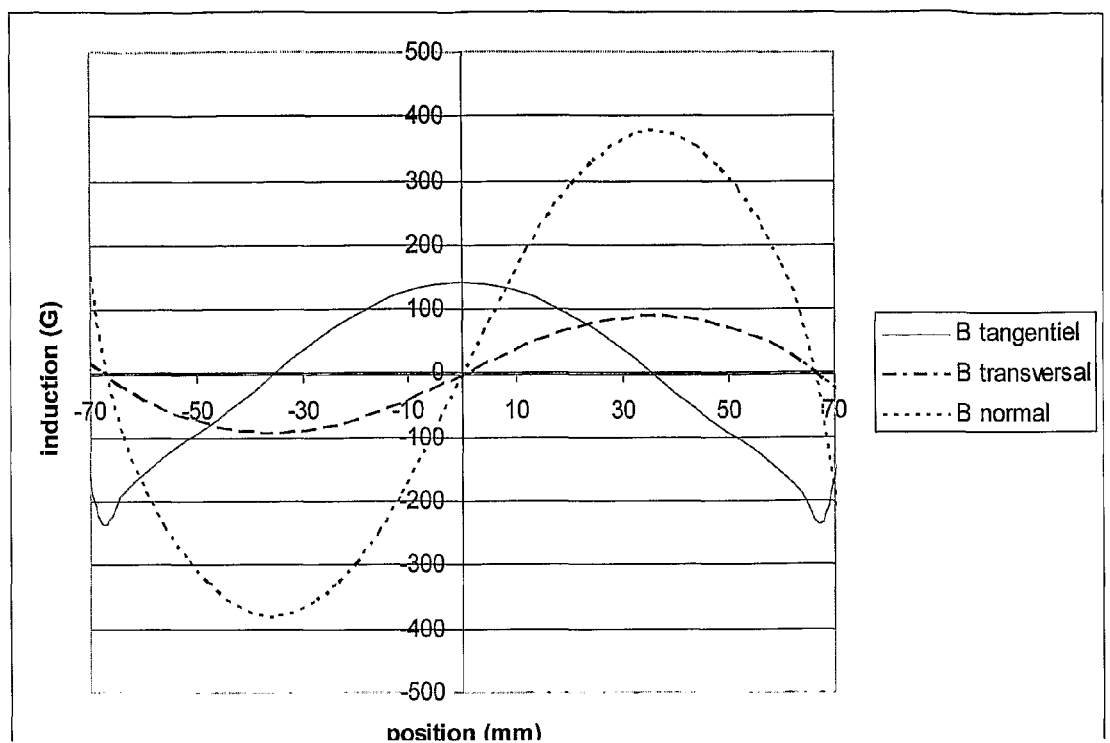
FIG. 3 shows the magnetic field obtained with the magnetization described by the present invention.
Figure 4:
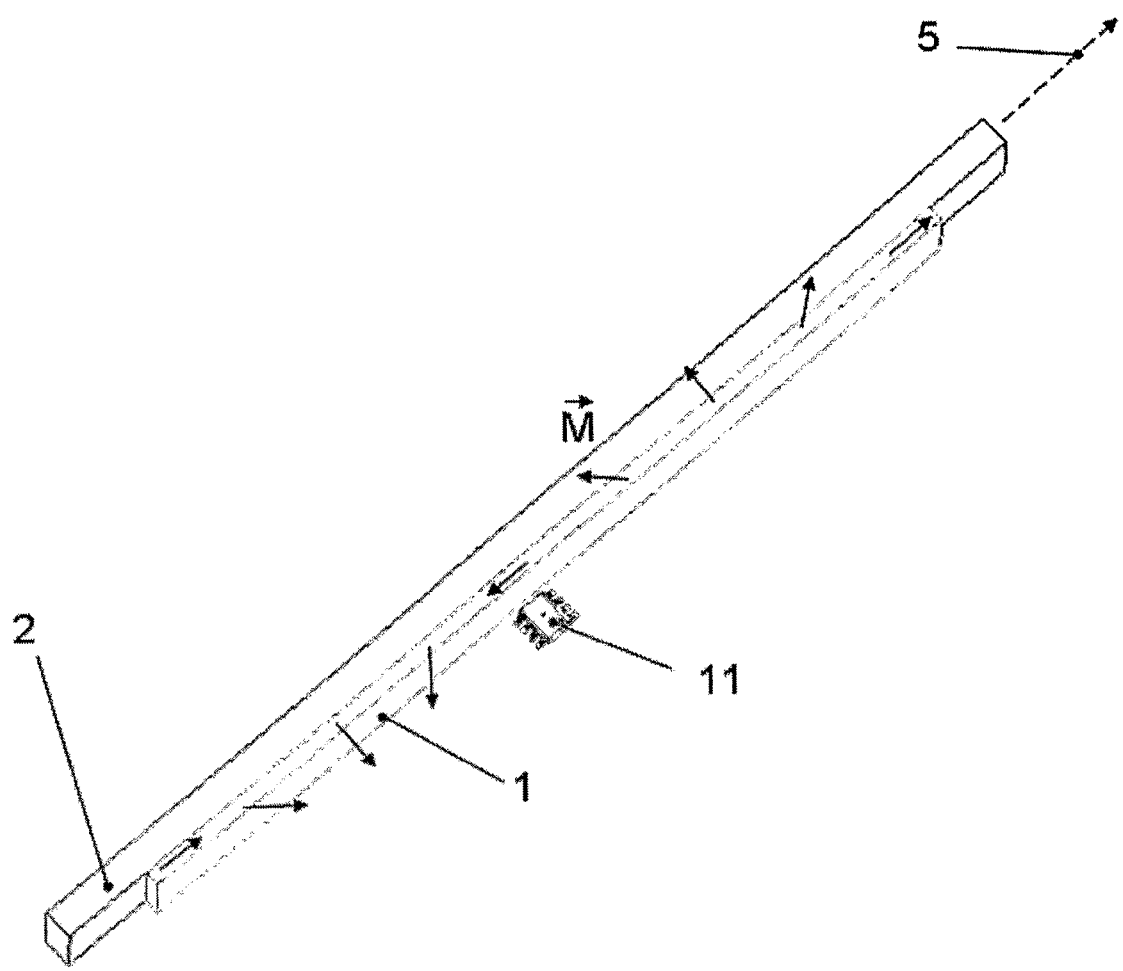
FIG. 4 shows the sensor in another embodiment comprising a magnet mounted on a ferromagnetic yoke.
Figure 5:
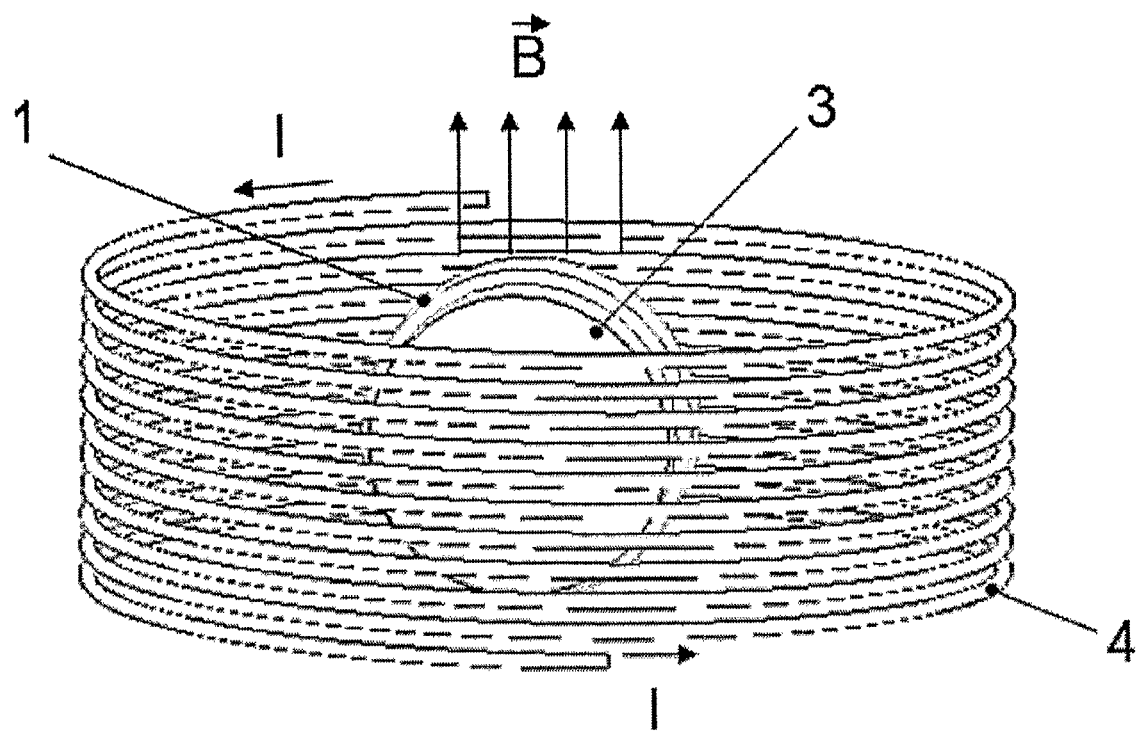
FIG. 5 shows a method described by the present invention for magnetizing the flexible magnet in a coil.
Figure 6:
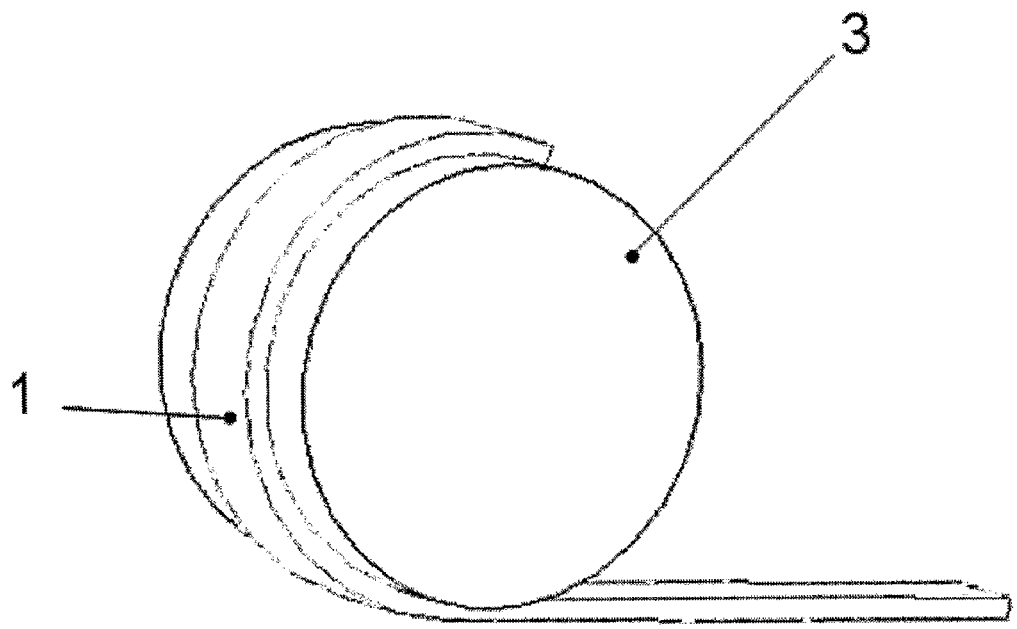
FIG. 6 shows how the magnet is unfolded.
Figure 11A:
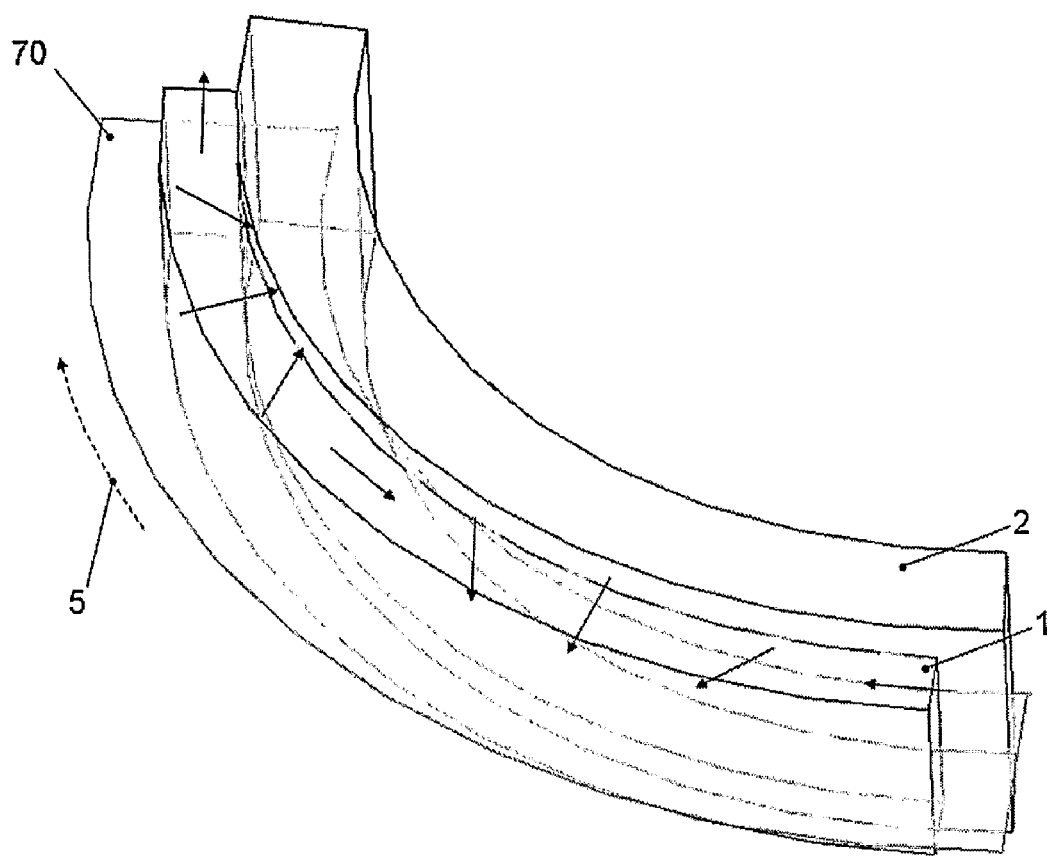
FIGS. 11a and 11b show the magnet for a rotary sensor whose working travel stroke is close to 90°.

FIG. 11a shows a magnet (1) magnetized on a support as shown in FIG. 5. Thus, the magnetization is defined in a plane (70) formed by the movement direction (5) and by a normal thereto, which normal lies within the plane in which the magnet (1) moves. The magnet (1) is mounted on a support (2) having a diameter that is four times larger than the magnetization support. The magnetization direction is non-uniform, and has a period equal to the length of the magnet that corresponds to a rotation through 90°, which defines the maximum travel stroke of the sensor.

Figure 11B:
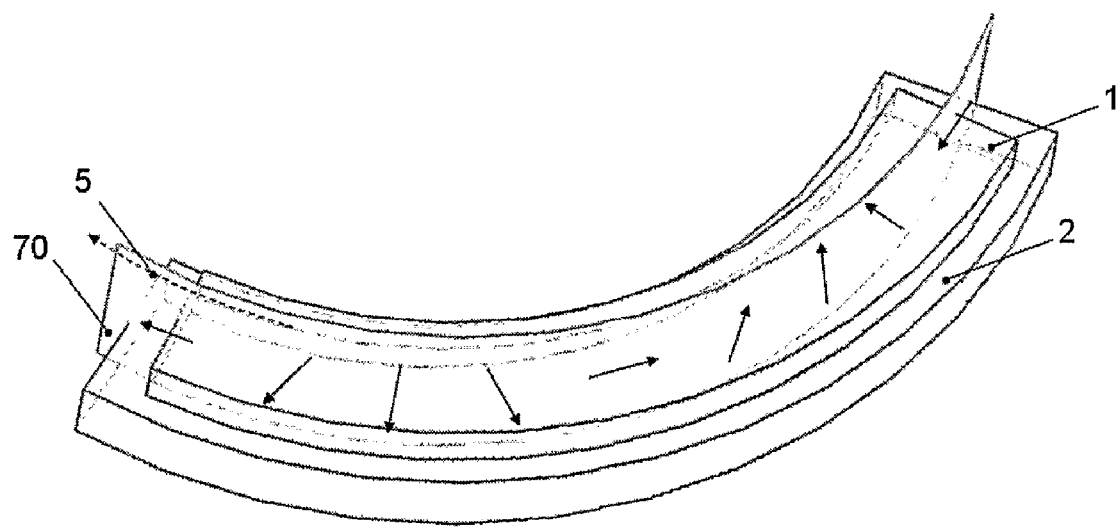

FIG. 11b shows a magnet (1) magnetized on a support as shown in FIG. 5. In this example, the magnetization is defined in a surface 70) that is non-plane, and that is formed by the movement direction (5) and by a normal thereto, which normal is perpendicular to the plane in which the magnet (1) moves.

Figure 12:
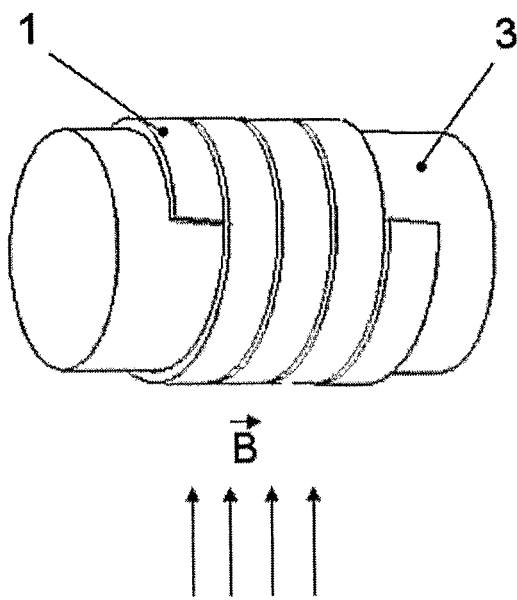
FIG. 12 shows a magnet wound four times around the magnetizing support.
Figure 13:
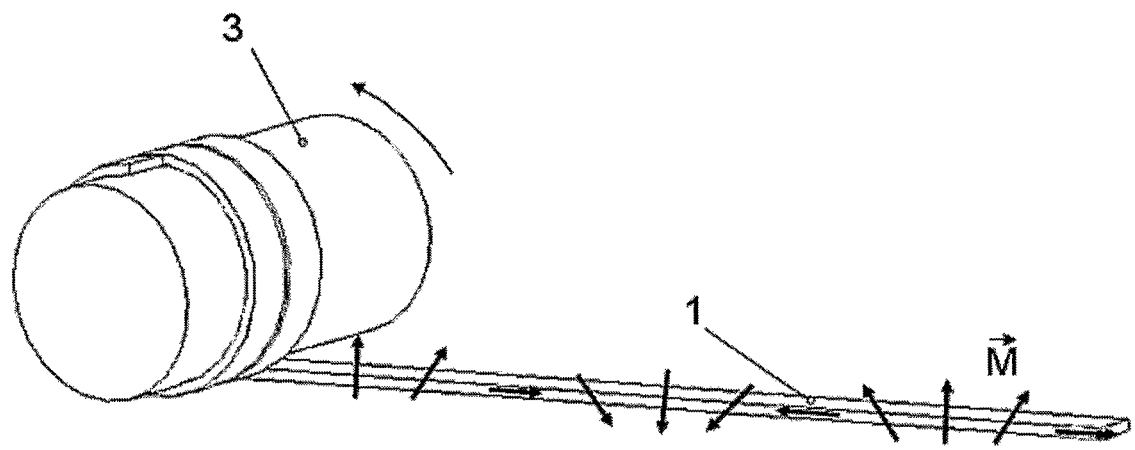
FIG. 13 shows how the magnet of FIG. 12 is mounted in a linear position sensor.
Figure 14:
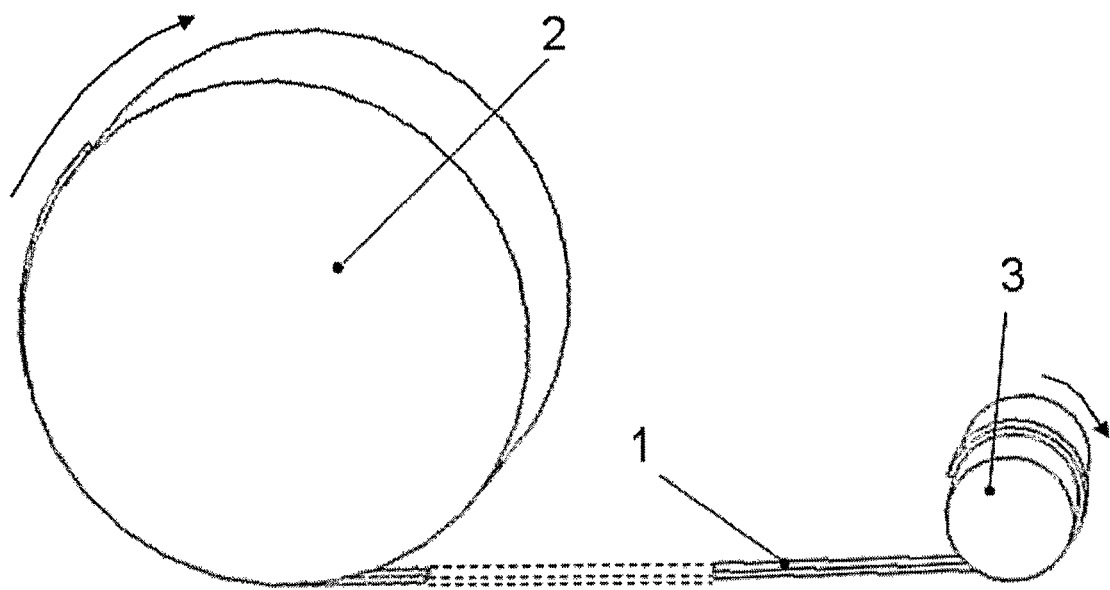
FIG. 14 shows how the magnet of FIG. 12 is mounted in a rotary sensor.

FIG. 12 shows a magnet (1) wound a plurality of times around the magnetization support (3). Once unfolded, it has a plurality of magnetization angle periods (see FIG. 13). For example, this makes it possible to obtain an angular travel stroke repeated a plurality of times (for example, 4 times 90°). This technique is shown in FIG. 14, with the magnetization of the magnet (1) wound around the support (2), and then mounted on the support (3). This is useful in certain assembly methods in which the position of the travel stroke measured is not known in advance.

Figure 15:
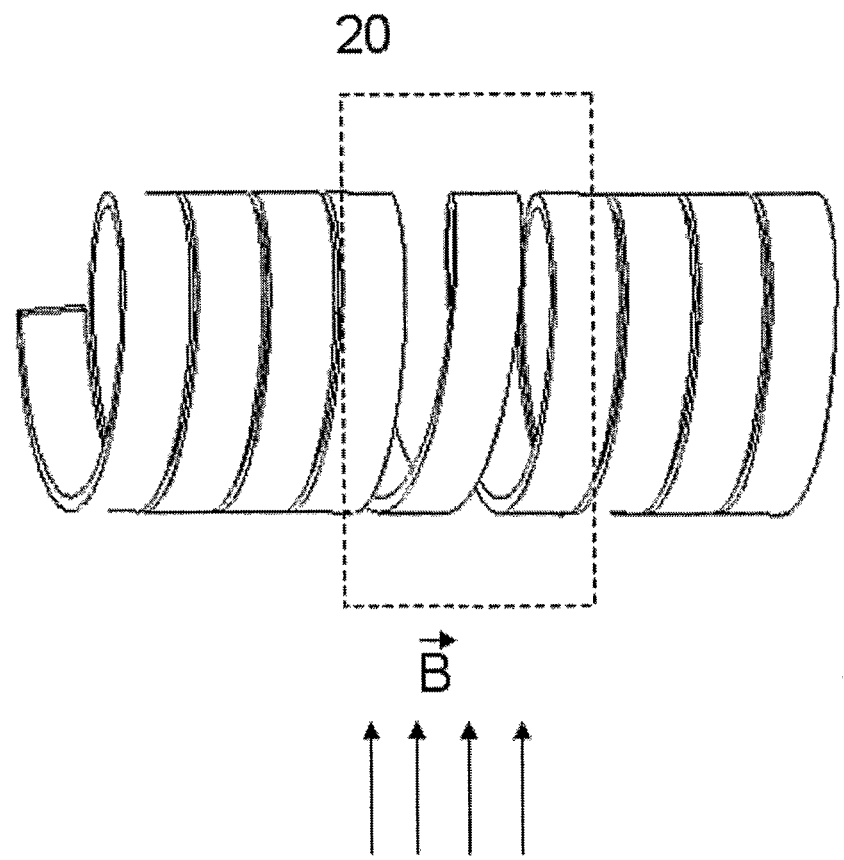
FIG. 15 shows the magnetization that generates a period of different length.

FIG. 15 shows a sensor presenting a plurality of magnetization angle periods. It is easily possible to insert one or more particularities (20) (magnetization periods that are more or less long). This can, for example, be useful for incremental sensors. In all these cases, it is naturally possible to obtain the same result by using a plurality of magnets.

Figure 16:
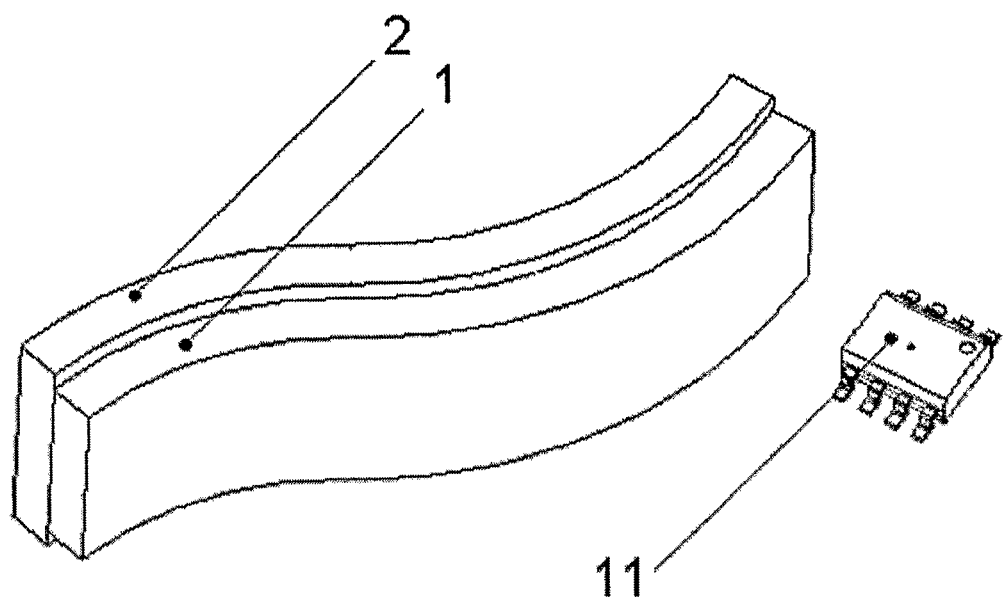
FIG. 16 shows the sensor with a magnet mounted on a curvilinear support.
Figure 17:
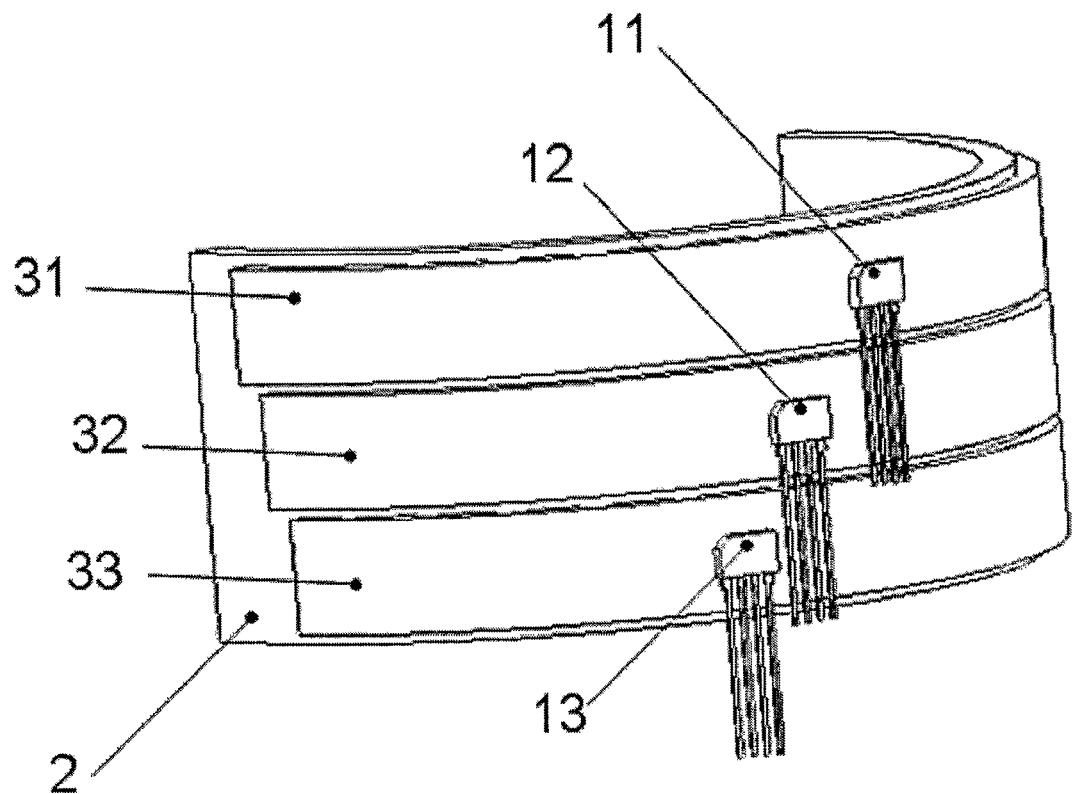
FIG. 17 shows a sensor with three magnets and three probes.

In FIG. 16, the magnet (1) is mounted on a yoke or on a support that is curved or curvilinear (2), in order to obtain a particular configuration for the magnetic field, as measured by a probe (11);

FIG. 17 shows an example of the sensor an example of the sensor provided with a plurality of tracks that are magnetized differently, with three magnets (31), (32) and (33) mounted on the same support (2) and the probes (11), (12), and (13) that measure the magnetic field of each magnet.

Figure 18:
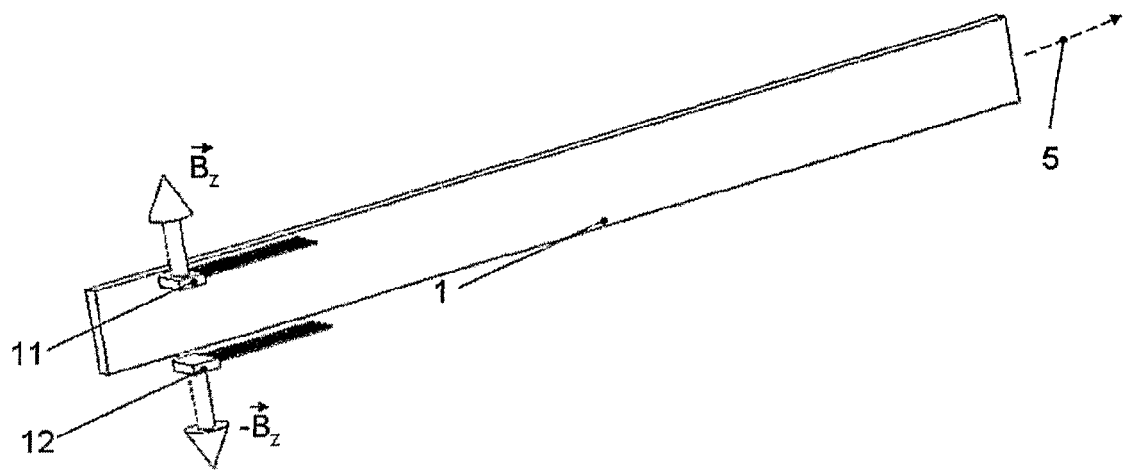
FIG. 18 shows a redundant sensor.

FIG. 18 shows a redundant sensor with two probes (11) and (12), measuring the component Z of the magnetic field, for the same position. This can be useful for eliminating or reducing the influence of an external magnetic field.

Figure 19:
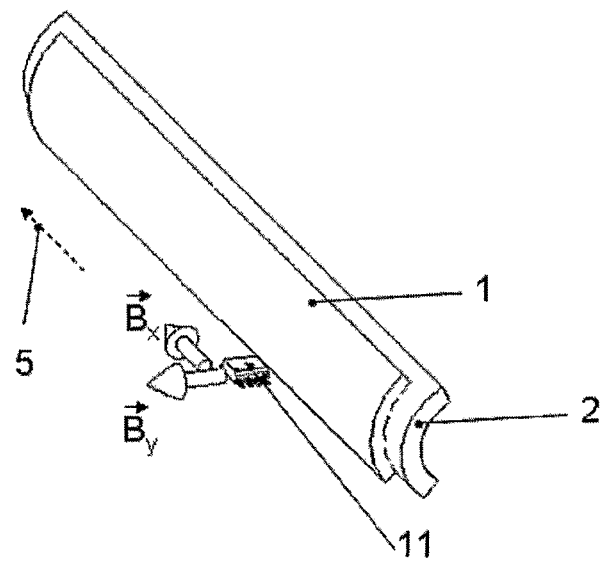
FIG. 19 shows an embodiment of the sensor with the magnet curved widthwise.

FIG. 19 shows an embodiment of the sensor with the magnet (1) curved widthwise, mounted on a yoke (2), with a probe (11) that measures the normal and tangential components of the magnetic field.

Figure 20:
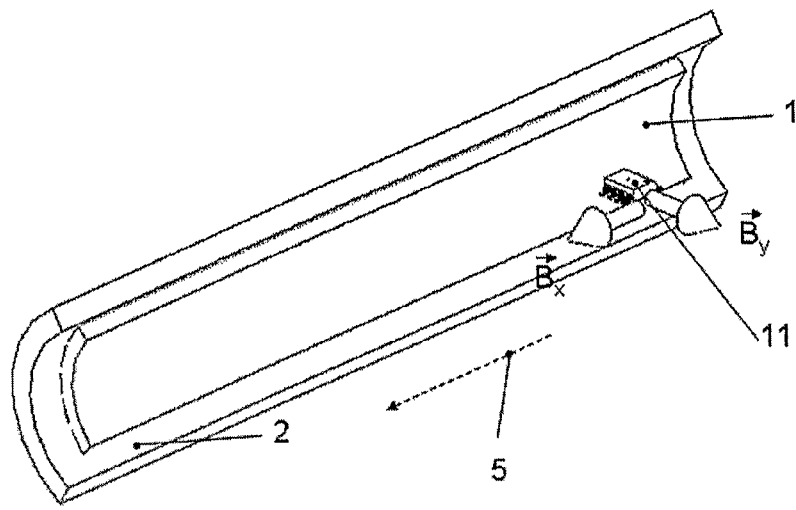
FIG. 20 shows another embodiment of the sensor with the magnet curved widthwise.

FIG. 20 shows another embodiment of the sensor with the magnet (1) curved widthwise, mounted on a yoke (2) and that can serve as shielding (if it is ferromagnetic). The probe (11) measures the normal and tangential components of the magnetic field.

Figure 21:
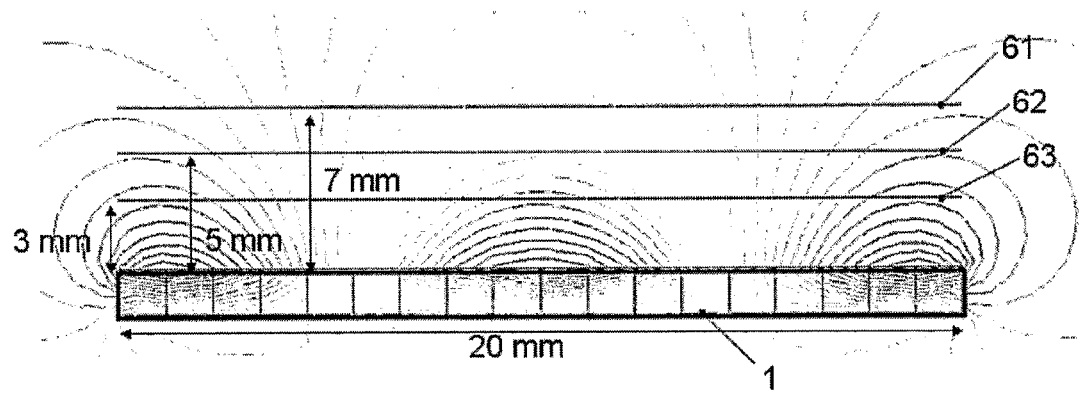
FIG. 21 shows the spread of the magnetic field lines for a linear sensor.

Edge effects can reduce the effective travel stroke of the sensor. Their influence is shown in FIG. 21. It can be observed that there exists a distance between the magnet (1) and the sensitive element (11) situated on a line (62) for which the end-of-stroke field lines are tangential to the movement direction. In which case, the travel stroke obtained is approximately equal to the length of the magnet (1). If the sensor (11) is situated on a line that is too close (63) or too distant (61), the field lines are no longer tangential and the travel stroke must therefore be reduced in order to procure proper operation of the sensor.

Figure 22:
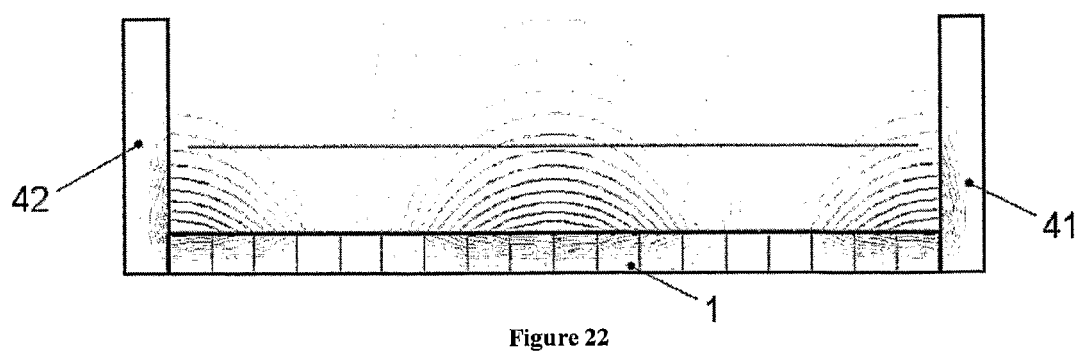
FIG. 22 shows another embodiment of the sensor, with end-of-stroke ferromagnetic pieces being used.

For certain sizes of magnet, the distance necessary can be too close to the magnet (1) and thus impossible to achieve, or too distant therefrom and therefore with too little a magnetic field to measure. In order to have an optimum travel stroke, two ferromagnetic pieces (41) and (42) are advantageously placed at either end of the magnet (1), thereby making the field lines tangential to the movement direction as shown in FIG. 22.

The maximum theoretical stroke obtained in this way is equal to the length of the magnet (1). In reality, it is necessary to take account of the measurement probe (11).

Figure 23:
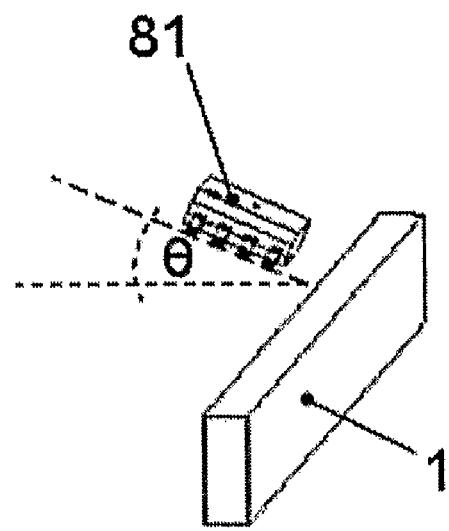
FIG. 23 shows another embodiment of the sensor with the measurement probe being inclined.

In the sensor presented, it is possible to obtain the angle of the magnetic field proportional to the movement, it suffices to incline the measurement plane relative to the magnetization plane as shown in FIG. 23. it is thus possible, by adjusting the angle of inclination θ of the probe (81), to measure the movement directly by computing $$\arctan\left(\frac{B_{y1}}{B_{x1}}\right)$$

without applying gain for compensating for the difference in amplitudes.

By using certain types of magnetoresistive probes, it is possible to obtain directly the direction of the magnetic field, and thus the movement, by using the following formula:

$$\alpha = \frac{1}{2}\arctan\left(\frac{V_B}{V_A}\right)$$

In FIG. 23, the probe (81) can thus be a Hall-effect probe or an anisotropic magnetoresistive (AMR) probe.

Figure 24:
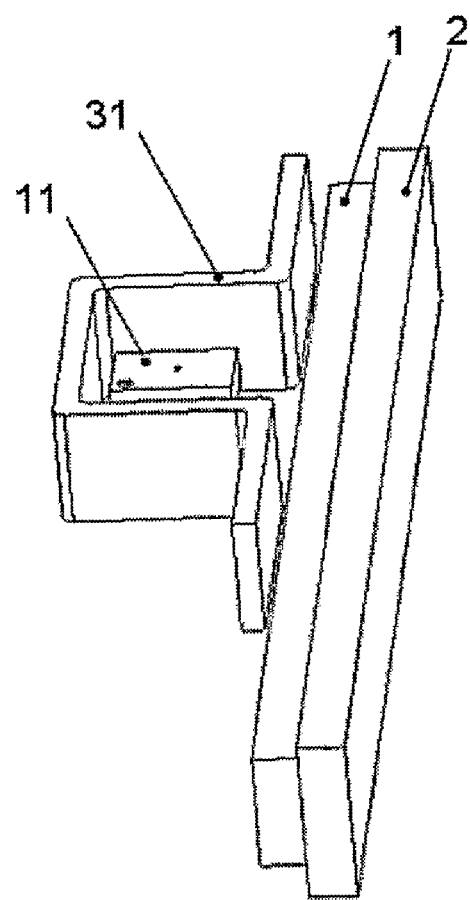
FIGS. 24 and 25 show another embodiment of the sensor with the use of shielding against external magnetic fields.
Figure 25:
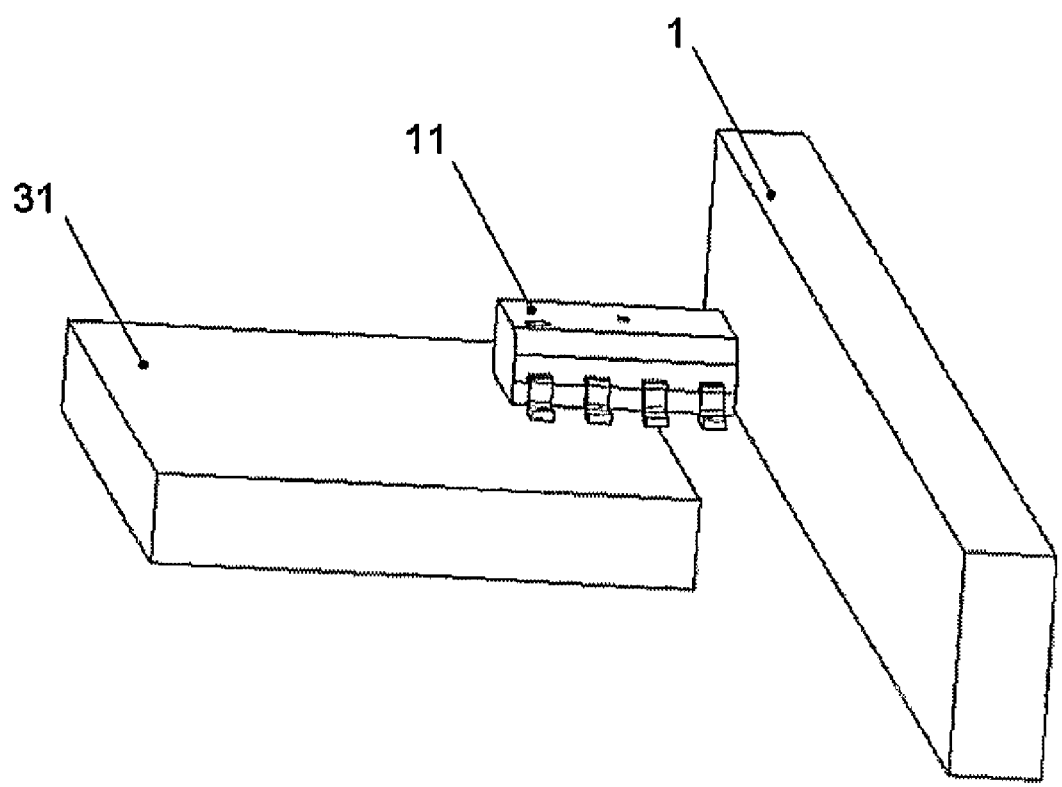

It is possible to add ferromagnetic shielding (31) in such a manner as to insulate the magnetosensitive portion (11) of the sensor magnetically from the external magnetic fields. An example of shielding (31) is given in FIG. 24 and in FIG. 25. The external field lines mainly pass through the ferromagnetic material of the shielding (11), because of its low reluctance relative to air, and do not influence the measurement.

The invention claimed is:

1. A movement magnetic sensor for sensing rotary, linear, or curvilinear movement comprising:
   at least one permanent magnet and at least one magnetosensitive element that are mounted to move relative to each other,
   wherein the magnet presents a magnetization direction that varies substantially linearly in the movement direction in which the magnet moves over a surface defined by the movement direction and by a normal direction, excluding diametrical magnetization when the sensor is a rotary sensor.

2. The movement magnetic sensor according to claim 1, wherein the defined surface is a plane surface.

3. The movement magnetic sensor according to claim 2, wherein the permanent magnet is a magnet generating a magnetic field whose normal component, and at least one of components constituted by its tangential component and by its transverse component, as measured at the surface of the magnet, vary periodically with N periods over the movement stroke.

4. The movement magnetic sensor according to claim 3, wherein the period N of variation of the magnetic field generated at the surface of the magnet is an integer.

5. The movement magnetic sensor according to claim 3, wherein the period N of variation of the magnetic field generated at the surface of the magnet is equal to 1.

6. The movement magnetic sensor according to claim 3, wherein the variation in the normal component and in at least one of the components constituted by the tangential component and by the transverse component is sinusoidal.

7. The movement magnetic sensor according to claim 6, wherein the normal component Y and the transverse component Z vary with the same phase, while the tangential component X is phase-shifted by one quarter of one period.

8. The movement magnetic sensor according to claim 1, wherein the movement is a linear movement.

9. The movement magnetic sensor according to claim 8, wherein the magnet is mounted on a curved or curvilinear support.

10. The movement magnetic sensor according to claim 1, wherein the movement is a rotary movement presenting a stroke different from 360°±5°.

11. The movement magnetic sensor according to claim 1, wherein the movement is a curvilinear movement.

12. The movement magnetic sensor according to claim 1, wherein the magnet is mounted on a ferromagnetic yoke.

13. The movement magnetic sensor according to claim 12, wherein the magnet is embedded in a ferromagnetic yoke.

14. The movement magnetic sensor according to claim 8, wherein the magnet is made of a flexible material.

15. The movement magnetic sensor according to claim 1, wherein the magnet is constituted by a discrete and deformable assembly of non-flexible magnets.

16. The movement magnetic sensor according to claim 1, comprising at least two magnetosensitive elements, measuring the component of the magnetic field that is tangential to the movement direction, and a linear combination of the normal component and of the transverse component of the magnetic field in the movement direction.

17. The movement magnetic sensor according to claim 16, further comprising a circuit for processing a signal that performs an arctangent computation by using two electrical signals that are phase-shifted by 90° coming from at least two of the magnetosensitive elements.

18. The movement magnetic sensor according to claim 17, wherein the circuit for processing the signal makes it possible to adjust the gains of the two signals useful for decoding the angle.

19. The movement magnetic sensor according to claim 18, wherein circuit for processing the signal makes it possible for the transfer function to be programmed non-linearly.

20. The movement magnetic sensor according to claim 18, wherein the at least two magnetosensitive elements and the circuit for processing the signal are integrated into a single common housing.

21. The movement magnetic sensor according to claim 1, comprising a plurality of magnets defining a plurality of tracks, each of which having a magnetization direction that varies continuously in the movement direction.

22. The movement magnetic sensor according to claim 1, wherein the magnetization direction presents a plurality of periods over the measured travel stroke.

23. The movement magnetic sensor according to claim 22, comprising at least two magnetization periods of different lengths.

* * * * *